US007692631B2

(12) United States Patent
Inokuchi et al.

(10) Patent No.: US 7,692,631 B2
(45) Date of Patent: Apr. 6, 2010

(54) SIGNAL PROCESSING SYSTEM FOR A POINTING INPUT DEVICE

(75) Inventors: Hiroyuki Inokuchi, Kyoto (JP); Hideo Omae, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 656 days.

(21) Appl. No.: 10/594,226

(22) PCT Filed: Mar. 10, 2005

(86) PCT No.: PCT/JP2005/004217

§ 371 (c)(1),
(2), (4) Date: Sep. 25, 2006

(87) PCT Pub. No.: WO2005/091127

PCT Pub. Date: Sep. 29, 2005

(65) Prior Publication Data

US 2007/0204700 A1    Sep. 6, 2007

(30) Foreign Application Priority Data

Mar. 23, 2004    (JP) ............................. 2004-085670

(51) Int. Cl.
*G09G 5/08* (2006.01)
(52) U.S. Cl. ..................................... 345/161
(58) Field of Classification Search ................. 345/161, 345/157; 463/38; 340/20, 21, 22
See application file for complete search history.

(56) References Cited

U.S. PATENT DOCUMENTS 4,961,009 A * 10/1990 Baik ........................... 327/103

| | | | |
|---|---|---|---|
| 6,429,850 B2 * | 8/2002 | Marten | 345/161 |
| 6,486,871 B1 * | 11/2002 | Marten | 345/157 |
| 2003/0085874 A1 * | 5/2003 | Burry | 345/161 |

FOREIGN PATENT DOCUMENTS

| JP | 2000-147028 A | 5/2000 |
|---|---|---|
| JP | 2001-236175 A | 8/2001 |
| JP | 2001-324519 A | 11/2001 |
| JP | 2003-4562 A | 1/2004 |

\* cited by examiner

*Primary Examiner*—Amare Mengistu
*Assistant Examiner*—Gene W Lee
(74) *Attorney, Agent, or Firm*—Sughrue Mion, PLLC

(57) ABSTRACT

It is possible to enable a pointer to execute a shifting operation input and a clicking operation input by use of a common type pressure-sensitive pointing device provided with an x-axis strain sensor and a y-axis strain sensor. A pressure-sensitive pointing device (11) is provided with strain sensors (11a), (11b), (11c) and (11d). A voltage corresponding to the strain along the x-axis direction, and a voltage corresponding to the strain along the y-axis direction are outputted from nodes (11e), (11f) and (11g), respectively. The voltage corresponding to the strain along the x-axis direction, and the voltage corresponding to the strain along the y-axis direction are inputted alternately to an operational amplifier (4) by switches (SW1) and (SW2) when a switch (SW3) is in an ON-condition. The voltage corresponding to the strain along the z-axis direction is inputted to an operational amplifier (3) when the switch (SW3) is in an OFF-condition. Respective outputs of the operational amplifiers (3), (4) are alternately inputted to an ADC (5) by switches (SW4) and (SW5) and processed in a digital processing circuit.

1 Claim, 10 Drawing Sheets

Prior Art

Prior Art

SIGNAL PROCESSING SYSTEM FOR A POINTING INPUT DEVICE

TECHNICAL FIELD

The invention relates to a system for processing signals outputted from a pointing device, and in particular, to a signal processing system enabling a pointer to execute a shifting operation input and a clicking operation input by use of a pressure-sensitive pointing device provided with load sensors having two axes X, Y.

BACKGROUND TECHNOLOGY

A pressure-sensitive pointing device installed in a keyboard of a notebook PC, and so forth is made up such that when a user presses down an operation console of the device in a desired direction with a fingertip, a load applied in that direction is detected by a strain sensor built inside the device, and a detection signal of the strain sensor is processed, whereupon a pointer such as a cursor, or the like, shown on a display of the notebook PC, is caused to shift. At this point in time, a shifting direction of the pointer is determined correspondingly to a direction of the load applied to the tip of the device, and a shifting speed is determined correspondingly to magnitude of the load.

As a conventional signal processing system for processing output signals of a pressure-sensitive pointing device (hereinafter referred to also as a pointing device), there is available an input unit as disclosed in Patent Document 1. FIG. 9 is a block diagram showing the input unit.

An output signal of a pressure-sensitive pointing device 131 is inputted to such a signal processing system 121. The pressure-sensitive pointing device 131 comprises a strain sensor 131a for detecting a load in a plus direction along an x-axis (hereinafter referred to as a +X direction), a strain sensor 131b for detecting a load in a minus direction along the x-axis (hereinafter referred to as a –X direction), a strain sensor 131c for detecting a load in a plus direction along a y-axis (hereinafter referred to as a +Y direction), and a strain sensor 131d for detecting a load in a minus direction along the y-axis (hereinafter referred to as a –Y direction), the respective loads resulting from an operation of an operation console, not shown. In this case, the x-axis refers to an axis in a side-to-side direction or in the lateral direction relative to the operation console of the pointing device 131, as seen from a user, while the y-axis refers to an axis in a front-to-back direction or the longitudinal direction relative to the operation console of the pointing device 131. Further, the x-axis corresponds to a side to side direction, or the lateral direction, on a display of a notebook PC, and so forth, in which the pointing device 51 is installed, and the y-axis corresponds to a front-to-back direction or the longitudinal direction, on the display.

The strain sensors 131a, 131b, 131c, 131d each are made up of a strain gauge such as a piezoelectric resistance element, and when the operation console, not shown, is operated in the +X direction, the –X direction, the +Y direction, and the –Y direction, respectively, the strain sensors 131a, 131b, 131c, 131d each are pressed downward corresponding to respective directions of operations, and respective resistance values thereof undergo a change due to the respective loads applied thereto. The strain sensors 131a, 131b are connected in series, and the strain sensors 131c, 131d are connected in series. Such series-connected circuits as described are connected in parallel, forming a parallel-connected circuit, and a power supply voltage Vdd is fed to the parallel-connected circuit. The four strain sensors, under no load, are equal in resistance value, however, when the operation console is pressed down in the +X direction, the –X direction, the +Y direction, and the –Y direction, respectively, the resistance value of any of the strain sensors 131a, 131b, 131c, 131d, positioned in the in the direction in which the operation console is pressed down, undergoes a change, whereupon a strain along the x-axis direction is detected as a voltage change via a node 131e between the strain sensors 131a, 131b, while a strain along the y-axis direction is detected as a voltage change via a node 131f between the strain sensors 131c, 131d. If the operation console is pressed down in a slanting direction (a direction within a plane containing the x-axis, and the y-axis, but non-parallel to the x-axis and the y-axis) at this point in time, there are detected a stain corresponding to an x-axis direction component of a vector in a direction in which the operation console is pressed down, and a stain corresponding to a y-axis direction component of the vector. Upon removal of the load, the respective resistance values of the strain sensors revert to the respective resistance values thereof, under no load, and potentials at the nodes 131e, 131f, respectively, revert to respective values before the voltage change. The nodes 131e and 131f are connected, respectively, to terminals 121a and 121c of the signal processing system 121.

Low-pass filters 132, 133 comprise capacitors 132a, 133a, and resistors 132b, 133b, respectively, and with the low-pass filters 132, 133, an upper cut-off frequency is set to on the order of 150 Hz so as to remove low frequency noise components out of respective output signals of operational amplifiers 123, 124, to be described later. Further, an output side of the low-pass filter 132 is connected to terminals 121a, 121b of the signal processing system 121, respectively, and an output side of the low-pass filter 133 is connected to terminals 121c, 121d of the signal processing system 121, respectively.

The signal processing system 121 comprises a digital processing circuit 122 having a CPU 122a, a ROM 122b, a RAM 122c, for executing control of the signal processing system 121 in whole, and so forth, the operational amplifier 123 having an inverting input side connected to the terminal 121a, and a noninverting input side connected to an output side of a digital-to-analog converter (hereinafter referred to as a DAC) 126 to be described later, an output side of the operational amplifier 123 being connected to the terminal 121b, the operational amplifier 124 having an inverting input side connected to the terminal 121c, and a noninverting input side connected to an output side of a DAC 127 to be described later, an output side of the operational amplifier 124 being connected to the terminal 121d, an analog switch SW 19 connected to the output side of the operational amplifier 123, an analog switch SW 20 connected to the output side of the operational amplifier 124, an analog-to-digital converter (hereinafter referred to as an ADC) 125 having an input side connected to a common output side of the analog switches SW 19, SW 20, and an output side connected to an input side of the digital processing circuit 122, the DAC 126 having an input side connected to an output side of the digital processing circuit 122, and the output side connected to the noninverting input side of the operational amplifier 123, and the DAC 127 having an input side connected to the output side of the digital processing circuit 122, and the output side connected to the noninverting input side of the operational amplifier 124. The low-pass filters 132, 133 serve as feedback circuits of the operational amplifiers 123, 124, respectively.

There is described hereinafter an operation of the signal processing system 121 having such a configuration described as above.

The voltage corresponding to the strain along the x-axis direction, outputted from the node 131e of the pointing device 131, is inputted from the terminal 121a to the inverting input side of the operational amplifier 123. Similarly, the voltage corresponding to the strain along the y-axis direction, outputted from the node 131f of the pointing device 131, is inputted from the terminal 121c to the inverting input side of the operational amplifier 124. Reference data outputted from the digital processing circuit 122 is converted into an analog reference voltage by the DAC 126 to be subsequently inputted to the noninverting input side of the operational amplifier 123. The reference data outputted from the digital processing circuit 122 is converted into the analog reference voltage by the DAC 127 to be subsequently inputted to the noninverting input side of the operational amplifier 124. Now, assuming that the strain sensors 131a, 131b, 131c, 131d, under no load, each have a resistance value Rs, and the resistors 132b, 133b of the low-pass filters 132, 133, respectively, each have a resistance value Rf, the operational amplifiers 123, 124 each have a gain of $-\{Rf/(Rs/2)\}$, so that a change (on the order of +10 mV) in the voltage corresponding to the strains along the x-axis, and the y-axis, respectively, can be amplified to a voltage change (on the order of ±1 V) centering around the analog reference voltage.

Rectangular waves Asw 19 and Asw 20, undergoing an alternate change in level for every detection period T1 (for example, 10 msec) as shown in FIG. 10, are inputted from the digital processing circuit 122, as switching control signals to the analog switches SW 19, SW 20, respectively. The analog switches SW 19, SW 20 are turned on, respectively, during a time period when the rectangular waves Asw 19, and Asw 20 are being held high, respectively, while the analog switches SW 19, SW 20 are turned on, respectively, during a time period when the rectangular waves Asw 19, Asw 20 are being held low, respectively, so that the analog switches SW 19, SW 20 are alternately turned on during the detection period T1. Accordingly, a voltage corresponding to the strain along the x-axis direction, and a voltage corresponding to the strain along the y-axis, alternately appear on the common output side of the analog switches SW 19, SW 20, that is, on the input side of the ADC 125, as shown in FIG. 10. Those strain voltages are digitized by the ADC 125 to be subsequently inputted to the digital processing circuit 122.

However, in a computer provided with a conventional pressure-sensitive pointing device, a key has to be pressed additionally so as to input a command to the computer at the position of the pointer, causing a problem of low operability compared with a pointing device enabling the pointer to execute the shifting operation input (input of coordinate) and the clicking operation input.

To solve such a problem, there is proposed a pressure-sensitive pointing device provided with strain sensors for detecting loads resulting from an operation console along the direction perpendicular to an x-axis and a y-axis directions in addition to strain sensors for detecting the load along the +X direction, -X direction, +Y direction and -Y direction, thereby enabling a pointer to execute a shifting operation input and a clicking operation input (Patent Reference 2).

Patent Reference 1 (JP 7-319617A)

Patent Reference 2 (JP 2001-311671A)

DISCLOSURE OF THE INVENTION

However, since the pressure-sensitive pointing device disclosed in the Patent Document 2 has a special configuration provided with 5 strain sensors, it costs high because of the increase of a component count. Accordingly, it is an object of the invention to enable a pointer to execute a shifting operation input and a clicking operation input by use of a common type pressure-sensitive pointing device provided with an x-axis strain sensor and a y-axis strain sensor.

MEANS FOR SOLVING PROBLEM

The invention is a signal processing system for processing signals outputted from a pointing device, the pointing device comprising a detection means capable of outputting respective detection signals outputted by operating an operation console in plus and minus directions, along an x-axis and/or y-axis thereof, respectively, in such a way as to identify whether an operation is in either the plus direction or the minus direction, along the x-axis and/or y-axis, respectively, or in both the plus and minus directions, along the x-axis and/or y-axis, respectively, a first outputting means for fetching the detection signals outputted by the operation in either the plus direction or the minus direction, along the x-axis and/or y-axis, respectively, from the detection means, and a second outputting means for fetching the detection signals outputted by the operations in both the plus and minus directions, along the x-axis and/or y-axis, respectively, wherein the signal processing system processes the output signal of the first outputting means as a shifting operation signal of a pointer, and processes an output signal of the second outputting means as a clicking operation signal of the pointer.

The invention is the foregoing signal processing system, characterized in that said detection means comprises a first resistance element which is changed in resistance value in response to a load applied to the device by operating the operation console in the plus direction along the x-axis and/or y-axis, and a second resistance element which is serially connected to the first resistance element and changed in resistance value in response to a load applied to the device by operating the operation console in the minus direction along the x-axis and/or y-axis, wherein a power supply is fed to one end of the serially connected circuits, and a terminal connected to a node between the resistance elements forms the first output means, while a terminal connected to the end of a power supply side of the serially connected circuits forms the second output means.

The invention is the foregoing signal processing system, characterized in further comprising a first switching circuit for switching over between the shifting operation signal in the x-axis direction and the shifting operation signal in the y-axis direction to thereby output the switched shifting operation signal, a first operational amplifier for amplifying the shifting operation signal in the x-axis direction and the shifting operation signal in the y-axis direction, respectively, outputted from the first switching circuit, a second operational amplifier for amplifying the clicking operation signal, a second switching circuit for switching over between the output signals of the first and second amplifiers to thereby output the switched output signal, and a controller for controlling the first and second switching circuits, wherein the controller executes control of switchover so that the first switching circuit outputs the shifting operation signal in the x-axis direction and the shifting operation signal in the y-axis direction alternately for every predetermined period, and the second switching circuit outputs the output signals of the first and second amplifiers alternately for every predetermined period.

The invention is the foregoing signal processing system, characterized in further comprising switching circuits for switching over between the shifting operation signal in the x-axis direction and the shifting operation signal in the y-axis direction, and the clicking operation signal to thereby output the switched signal, amplifiers for amplifying the shifting operation signal in the x-axis direction, the shifting operation signal in the y-axis direction, and the clicking operation signal, respectively outputted from the switching circuits, and a controller for controlling the switching circuits, wherein the controller executes control of switchover such that the switching circuits output the shifting operation signal in the x-axis direction, the shifting operation signal in the y-axis direction and the clicking operation signal circularly for every predetermined period.

The invention is the foregoing signal processing system, characterized in further comprising a first amplifier for amplifying the shifting operation signal in the x-axis direction, a second amplifier for amplifying the shifting operation signal in the y-axis direction, a third amplifier for amplifying the clicking operation signal, switching circuits for switching over between output signals of the first to third amplifiers to thereby output the switched signal, and a controller for controlling the switching circuits, wherein the controller executes control of switchover so that the switching circuits output the shifting operation signal in the x-axis direction, the shifting operation signal in the y-axis direction and the clicking operation signal circularly for every predetermined period.

The invention is the foregoing signal processing system, characterized in further comprising a current mirror circuit for copying the clicking operation signal.

The invention is the foregoing signal processing system, characterized in further comprising a first amplifier for amplifying the shifting operation signal in the x-axis direction, a second amplifier for amplifying the shifting operation signal in the y-axis direction, a current-voltage converter for converting an output current of the current mirror circuit into a voltage, a third amplifier for amplifying an output signal of the current-voltage converter, switching circuits for switching over output signals of the first to third amplifiers to thereby output the switched signal, and a controller for controlling the switching circuits, wherein the controller executes control of switchover between the output signals of the first to third amplifiers so that the switching circuits output the shifting operation signal in the x-axis direction, the shifting operation signal in the y-axis direction and the clicking operation signal circularly for every predetermined period.

The invention is the foregoing signal processing system, characterized in further comprising a first amplifier for amplifying the shifting operation signal in the x-axis direction, a second amplifier for amplifying the shifting operation signal in the y-axis direction, switching circuits for switching over between output signals of the first and second amplifiers to thereby output the switched signal, an oscillator which is changed in oscillation frequency in response to an output current of the current mirror circuit, a frequency measuring circuit for measuring the oscillation frequency of the oscillator, and a controller for controlling the switching circuits, wherein the controller executes control of switchover between the output signals of the first and second amplifiers so that the switching circuits output the shifting operation signal in the x-axis direction and the shifting operation signal in the y-axis direction alternately for every predetermined period.

EFFECT OF INVENTION

According to the signal processing system of the invention, the pointer can execute the shifting operation input and the clicking operation input by use of a common type pressure-sensitive pointing device provided with the x-axis strain sensor and y-axis strain sensor, thereby realizing enhancement in operability of the common type pointing device, and expansion in the function of the system. In addition, variation of the voltage to be fed to the first to third amplifier and switching circuits can be avoided even if the load applied to the current detection circuit doubling as the regulator is varied to thereby vary the output voltage due to the change in the resistance elements of the pointing device.

BEST MODE FOR CARRYING OUT THE INVENTION

Preferred embodiments of the invention are described hereinafter with reference to the accompanying drawings.

First Embodiment

Figure 1:
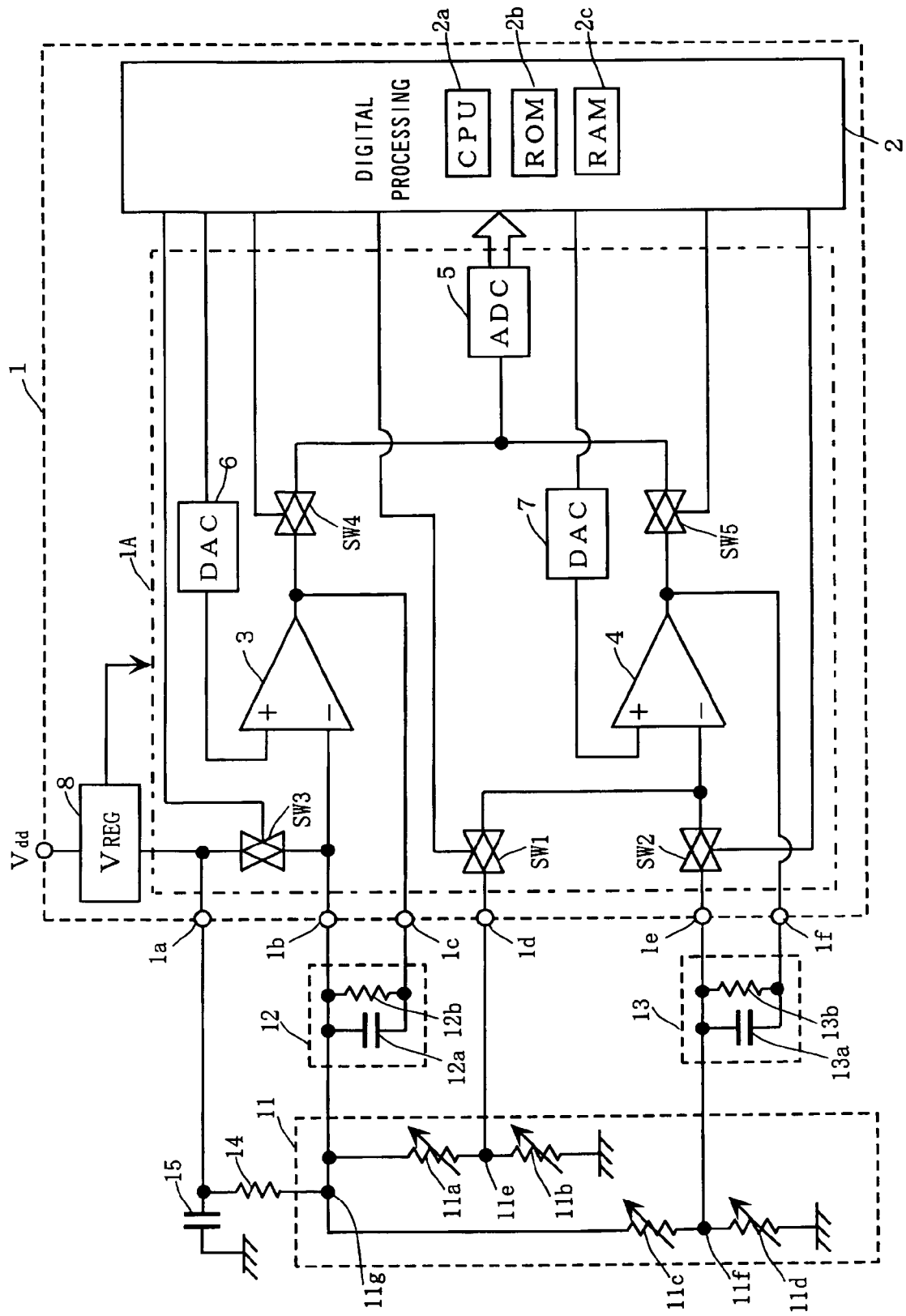
FIG. 1 is a view showing a construction of a first embodiment of a signal processing system according to the invention.
Figure 2:
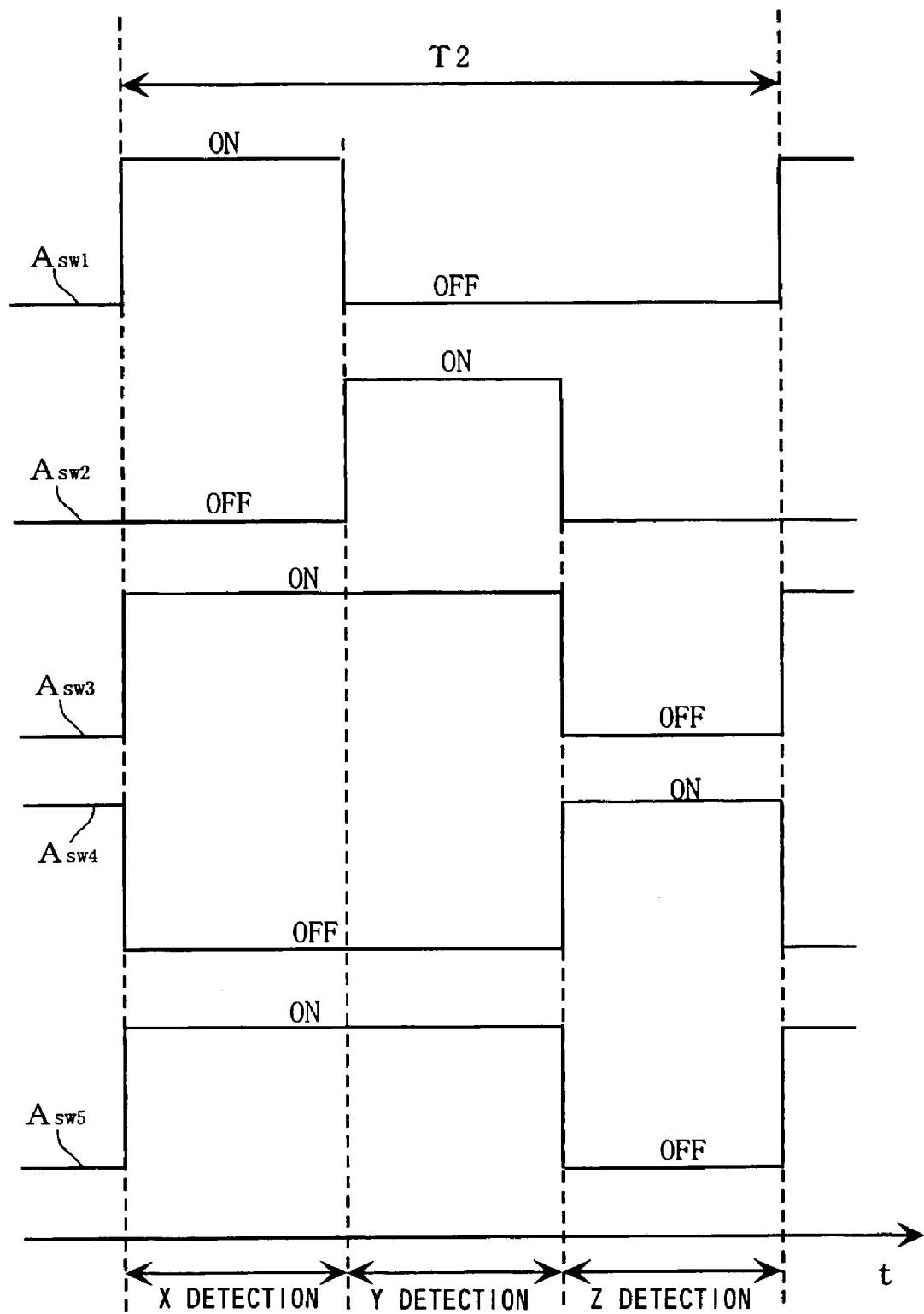
FIG. 2 is an operation timing chart of the signal processing system according to the first embodiment.

FIG. 1 is a view showing a construction of a first embodiment of a signal processing system according to the invention, and FIG. 2 is an operation timing chart thereof.

The signal processing system 1 according to the present embodiment is made up of ICs, and as shown in FIG. 1, an output signal of a pressure-sensitive pointing device 11 is inputted to the signal processing system 1. The pressure-sensitive pointing device 11 comprises a strain sensor 11a for detecting a load in the +X direction, a strain sensor 11b for detecting a load in the −X direction, a strain sensor 11c for detecting a load in the +Y direction, and a strain sensor 11d for detecting a load in the −Y direction, the respective loads resulting from an operation of an operation console, not shown. The strain sensors 11a, 11b, 11c, 11d each are made up of a strain gauge such as a piezoelectric resistance element, and when the operation console, not shown, is operated in the +X direction, the −X direction, the +Y direction, and the −Y direction, respectively, the strain sensors 11a, 11b, 11c, 11d each are pressed downward corresponding to respective directions of operation, and respective resistance values thereof undergo a change due to the respective loads applied thereto. Further, when the operation console is operated in a direction perpendicular to the x-axis and y-axis, all the strain sensors 11a, 11b, 11c and 11d are pressed downward, and respective resistant values thereof undergo change due to the respective loads applied thereto. Further, the strain sensors 11a, 11b are connected in series, and the strain sensors 11c, 11d are connected in series. Such series-connected circuits as described are connected in parallel, forming a parallel-connected circuit, and a constant potential Vreg is fed from the regulator 8, described later, via a resistor 14, to the parallel-connected circuit. A capacitor 15 is provided for the purpose of decoupling. In this case, the resistor 14 has a resistance value set to a value equal to the resistance value of the four strain sensors 11a to 11d, under no load.

The four strain sensors, under no load, are equal in resistance value, however, when the operation console of the pointing device is pressed down in the respective directions, a resistance value of any of the strain sensors, in the direction in which the operation console is pressed down, undergoes a change, whereupon a strain along the x-axis direction is detected as a voltage change via a node 11e between the strain sensors 11a, 11b while a strain along the y-axis direction is detected as a voltage change via a node 11f between the strain sensors 11c, 11d. Further, a strain along the z-axis direction is detected as a voltage change via a node 11g between the resistor 14 and the strain sensors 11a, 11c. Herein, the z-axis direction refers to the direction perpendicular to the x-axis and the y-axis, and the voltage change at the node 11g, due to the load pressing down the whole operation console of the pressure-sensitive pointing device 11 (corresponding to click of the mouse) is detected as the strain along the z-axis direction. Upon removal of the loads, the respective resistance values of the strain sensors revert to the respective resistance values under no load, and potentials at the nodes 11e, 11f, 11g, respectively revert to the respective values before the respective voltage changes. The strain along the x-axis direction is detected as a voltage change via the node 11e, and a strain along the y-axis direction is detected as a voltage change via the node 11f while a strain along the z-axis direction is detected as a voltage change via the node 11g. The nodes 11e, 11f, 11g are connected, respectively, to terminals 1d, 1e, 1b of the signal processing system 1.

Low-pass filters 12, 13 comprise capacitors 12a, 13a, and resistors 12b, 13b, respectively, and with the low-pass filters 12, 13, respectively, an upper cut-off frequency is set to on the order of 150 Hz so as to remove low frequency noise components out of respective output signals of operational amplifiers 3, 4, to be described later. Further, an output side of the low-pass filter 12 is connected to terminals 1b, 1c of the signal processing system 1, respectively, and an output side of the low-pass filter 13 is connected to terminals 1e, 1f of the signal processing system 1, respectively. Those low-pass filters 12, 13 are equivalent in a basic function to the conventional low-pass filters 132, 133.

The signal processing system 1 comprises a digital processing circuit 2 having a CPU 2a, a ROM 2b, a RAM 2c, for executing control of the signal processing system 1 in whole, and so forth, a switch SW1 having an input side connected to the terminal 1d and an output side connected to an inverting input side of the operational amplifier 4, described later, a switch SW2 having an input side connected to the terminal 1e, and an output side connected to the inverting input side of the operational amplifier 4, described later, the operational amplifier 3 having an inverting input side connected to the terminal 1b, and a noninverting input side connected to an output side of a DAC 6, described later, and an output side of the operational amplifier 3 being connected to the terminal 1c, the operational amplifier 4 having an inverting input side connected to a common output side of the analog switches SW1, SW2, and a noninverting input side connected to an output side of a DAC 7, described later, and an output side of the operational amplifier 4 being connected to the terminal 1f, an analog switch SW4 connected to the output side of the operational amplifier 3, an analog switch SW5 connected to the output side of the operational amplifier 4, an ADC 5 connected to a common output side of the analog switches SW4, SW5, a DAC 8 having an input side connected to an output side of the digital processing circuit 2, and an output side connected to the noninverting input side of the operational amplifier 3, and the DAC 7 having an input side connected to the output side of the digital processing circuit 2, and an output side connected to the noninverting input side of the operational amplifier 4, a regulator 8 for generating a constant potential Vreg from the power supply voltage Vdd, and a switch SW3 connected between an output side of the regulator 8 and the inverting input side of the operational amplifier 3. In view of the configuration of the pressure-sensitive pointing device 11, an amplitude of the voltage corresponding to the strain along the z-axis direction outputted from the node 11g is smaller than that of the voltage corresponding to the strain along the x-axis direction and that along the y-axis direction, so that the operational amplifier 3 preferably has a gain greater than that of the operational amplifier 4.

The output side of the regulator 8 is connected to the terminal 1a to which the resistor 14 and the capacitor 15, described before, are connected. Further, the switch SW3 is connected between the terminal 1a and the terminal 1b. The low pass filters 12, 13 serve as feedback circuits of the operational amplifiers 3, 4, respectively. Further, the constant potential Vreg is fed from the regulator 8 to the circuit within an area 1A surrounded by one dotted chain line. Since such a stable voltage Vreg is fed, offset voltages of the operational amplifiers 3, 4, respectively, become smaller in value, so that it is possible to render respective areas of the operational amplifiers 3, 4 smaller than those for the conventional operational amplifiers 123, 124.

There is described hereinafter an operation of the signal processing system 1 having the configuration described as above.

The voltage corresponding to the strain along the x-axis direction outputted from the point 11e of the pressure-sensitive pointing device 11 is fed from the terminal 1d to the input side of the analog switch SW1. Further, the voltage corresponding to the strain along the y-axis direction outputted from the point 11f of the pressure-sensitive pointing device 11 is fed from the terminal 1e to the input side of the analog switch SW2. Further, the voltage corresponding to the strain along the z-axis direction outputted from the point 11g of the pressure-sensitive pointing device 11 is fed from the terminal 1b to the inverting input side of the operational amplifier 3.

Rectangular waves Asw 1, Asw 2, Asw 3, undergoing a periodic change in level for every detection period T2, are inputted from the digital processing circuit 2 to the analog switches SW1, SW2, SW3, as switching control signals, as shown in FIG. 2. The rectangular waves Asw 1, Asw 2 is being held high alternately during a time period when the rectangular wave Asw 3 is being held high. The analog switches SW1, SW2, SW3 are turned on during a time period when the rectangular waves Asw 1, Asw 2, Asw 3 are being held high, and the analog switches SW1, SW2, SW3 are turned on during a time period when those rectangular waves are being held low, so that the switch SW3 are alternately turned on for every detection period T2, and the analog switches SW1, SW2 are alternately turned on while the switch SW 3 is in the ON-condition In this connection, because both the ends of the resistor 14 are short-circuited while the switch SW 3 is in the ON-condition, a potential at the node 11g of the pointing device 11, and a potential on the inverting input side of the operational amplifier 3 are fixed to an output potential of the regulator 8. Accordingly, the voltage corresponding to the strain along the z-axis direction is not inputted to the inverting input side of the operational amplifier 3. During a time period when the switch SW 3 is in the ON-condition, and the analog switch SW 1 is turned on, the voltage corresponding to the strain along the x-axis direction, outputted from the node 11e of the pointing device 11, is inputted to the inverting input side of the operational amplifier 4 during a time period when the switch SW 3 is in the ON-condition, and the analog switch SW 2 is turned on, the voltage corresponding to the strain along the y-axis direction, outputted from the node 11f of the pointing device 11, is inputted to the inverting input side of the operational amplifier 4. That is, the voltage corresponding to the strain along the x-axis direction, and the voltage corresponding to the strain along the y-axis direction are alternately inputted to the inverting input side of the operational amplifier 4. Meanwhile, during a time period when the switch SW 3 is in the OFF-condition, the voltage corresponding to the strain along the z-axis direction, outputted from the node 11g of the pointing device 11, is inputted to the inverting input side of the operational amplifier 3.

Now, there is described hereinafter the reason why the resistor 14 is provided. The resistance value of the resistor 14 is set to the value equal to the resistance value of the four strain sensors 11a to 11d, under no load, as previously described. Accordingly, assuming that the output potential of the regulator 8 is Vreg, potentials at the nodes 11e, 11f, respectively, under no load, become Vreg/2 during a time period when the switch SW 3 is in the ON-condition, so that the voltage corresponding to the strain along the x-axis direction, and the voltage corresponding to the strain along the y-axis direction undergo a change centering around Vreg/2. Further, during a time period when the switch SW 3 is in the OFF-condition, a potential at the node 11g, under no load, will be Vreg/2, so that the voltage corresponding to the strain along the z-axis direction undergoes a change from Vreg/2. In other words, the resistor 14 is provided so that the voltages corresponding to the respective strains along the x-axis direction, the y-axis direction, and the z-axis direction are aligned with each other.

Reference data outputted from the digital processing circuit 2 is converted into an analog reference voltage by the DAC 6 to be subsequently inputted to the noninverting input side of the operational amplifier 3. The reference data outputted from the digital processing circuit 2 is converted into the analog reference voltage by the DAC 7 to be subsequently inputted to the noninverting input side of the operational amplifier 4. Accordingly, the voltage corresponding to the strain along the x-axis direction, and the voltage corresponding to the strain along the y-axis direction are alternately amplified by the operational amplifier 4 during a time period when the rectangular waves Asw 1, Asw 2 shown in FIG. 2, are being held high, respectively, and the voltage corresponding to the strain along the z-axis direction is amplified by the operational amplifier 3 during the period when the rectangular wave Asw 3, shown in FIG. 2, is being held low.

Rectangular waves Asw 4, Asw 5, undergoing an alternate change in level, for every detection period T2 as shown in FIG. 2, are inputted as switching control signals from the digital processing circuit 2 to the analog switches SW 4, and SW 5, respectively, the analog switches SW 4, and SW 5 being provided on the output side of the operational amplifiers 3, 4, respectively. The analog switches SW 4, and SW 5 are each turned on during a time period when the rectangular waves Asw 4, and Asw 5 are being held high, respectively, while the analog switches SW 4, and SW 5 are each turned off during a time period when the rectangular waves Asw 4, and Asw 5 are being held low, respectively, so that the analog switches SW 4, and SW 5 are alternately turned on for every detection period T2. Accordingly, the voltage corresponding to the strain along the x-axis direction, the voltage corresponding to the strain along the y-axis direction, and the voltage corresponding to the strain along the z-axis direction circularly appear on the common output side of the SW 4, and SW 5, that is, to the input side of the ADC 5, as shown in FIG. 2. Those voltages corresponding to the respective strains are digitized by the ADC 5 to be subsequently inputted to the digital processing circuit 2.

Figure 3:
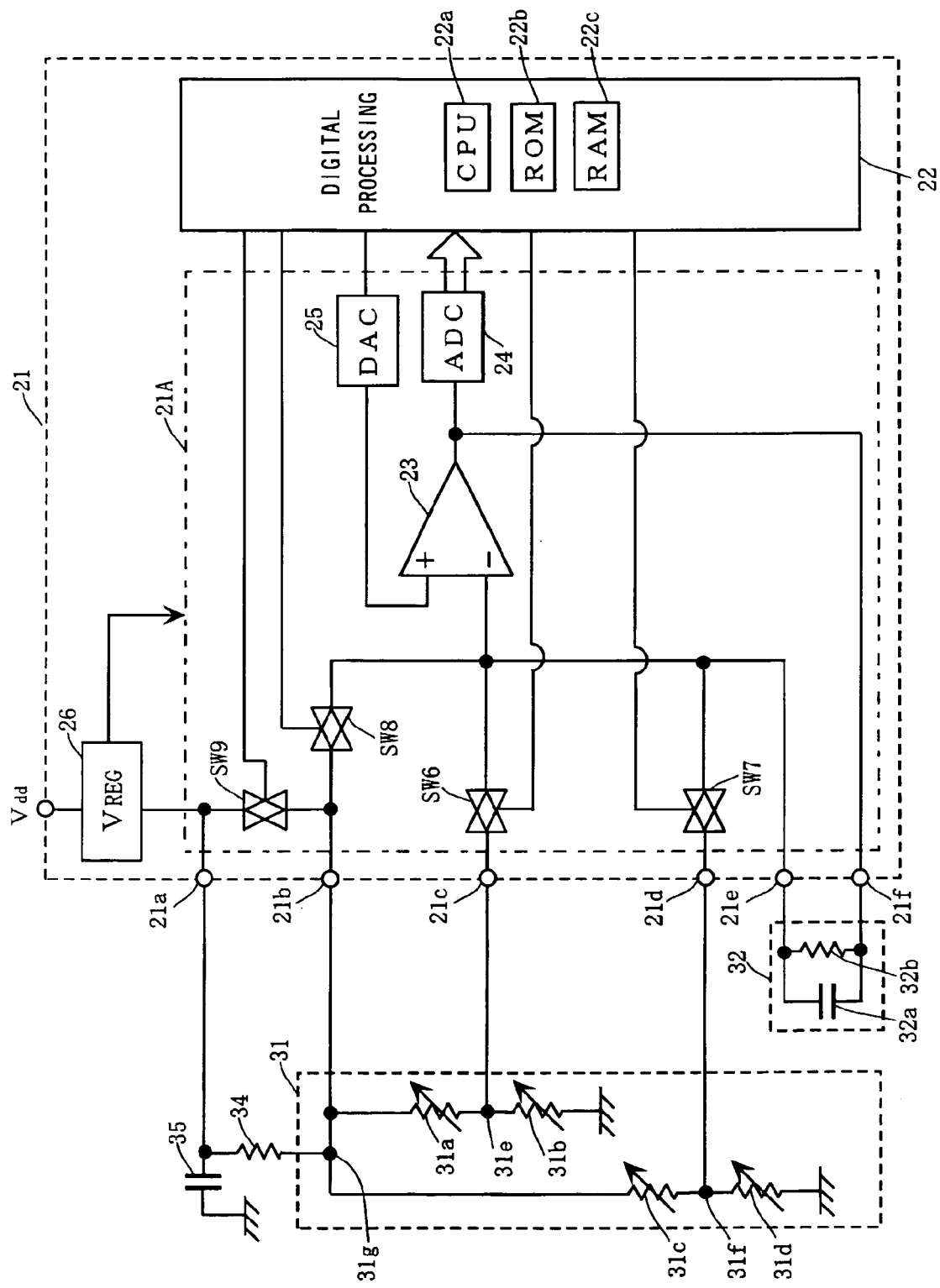
FIG. 3 is a view showing a construction of a second embodiment of a signal processing system according to the invention.
Figure 4:
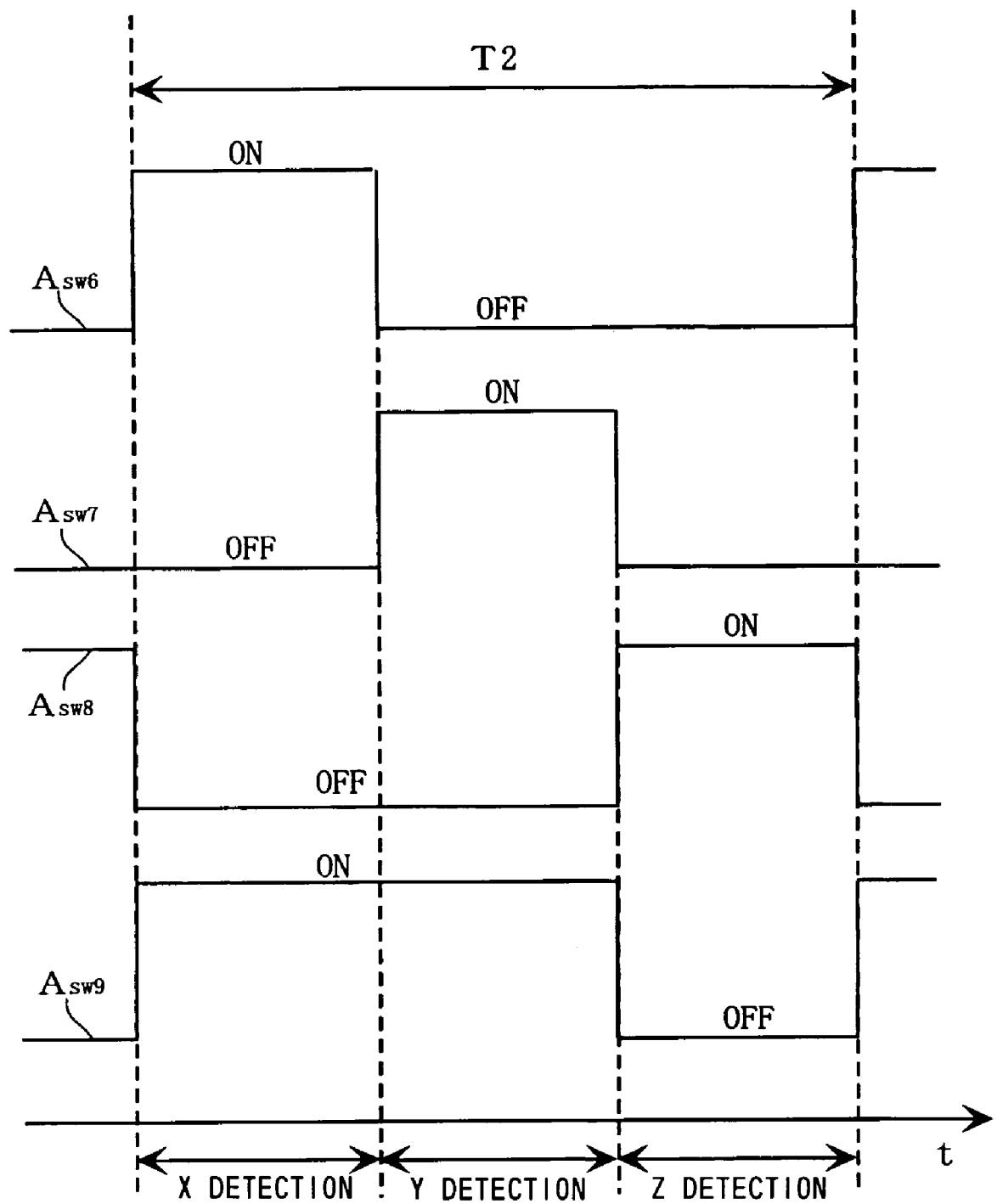
FIG. 4 is an operation timing chart of the signal processing system according to the second embodiment.

Thus, according to the embodiment of the invention, enhancement in operability of the pointing device, and expansion in the function of the system can be realized by adding a function of tapping (clicking) and determining respective loads on the sensors in whole by use of an existing pointing device comprising x-axis strain sensors, and y-axis strain sensors, Second Embodiment FIG. 3 is a view showing a construction of a second embodiment of a signal processing system according to the invention and FIG. 4 is an operation timing chart thereof.

As shown in FIG. 3, an output signal of a pressure-sensitive pointing device 31 is inputted to a signal processing system 21 of the present embodiment. The pressure-sensitive pointing device 31 comprises a strain sensor 31a for detecting a load in a +X direction, a strain sensor 31b for detecting a load in a −X direction, a strain sensor 31c for detecting a load in a +Y direction, and a strain sensor 31d for detecting a load in a −Y direction, the respective loads resulting from an operation of an operation console, not shown. The strain sensors 31a, 31b are connected in series, and the strain sensors 31c, 31d are connected in series. Such series-connected circuits as described are connected in parallel, forming a parallel-connected circuit, and a constant potential Vreg is fed from a regulator 26 to be described later to the parallel-connected circuit via a resistor 34. A capacitor 35 is provided for the purpose of decoupling. In this case, the resistor 34 has a resistance value set to a value equal to the resistance value of the four strain sensors 31a to 31d, under no load. Since the operation when detecting the strain of the pressure-sensitive pointing device 31 is the same as that of the pressure-sensitive pointing device 11 of the first embodiment, omitting therefore description thereof.

A low-pass filter 32 comprises a capacitor 32a and a resistor 32b, and with the low-pass filter 32, an upper cut-off frequency is set to on the order of 150 Hz so as to remove low frequency noise components out of an output signal of an operational amplifier 23, to be described later. Further, an output side of the low-pass filter 32 is connected to terminals 21e, 21f of the signal processing system 21, respectively. The low-pass filter 32 is equivalent in a basic function to the low-pass filter 12 of the first embodiment.

The signal processing system 21 comprises a digital processing circuit 22 having a CPU 22a, a ROM 22b, a RAM 22c, for executing control of the signal processing system 21 in whole, and so forth, switches SW 6, SW 7, SW 8 having respective input sides connected to terminals 21c, 21d, 21b, respectively, and an output side connected in common to an inverting input side of the operational amplifier 23, described later, the operational amplifier 23 having an inverting input side connected to respective output sides of the switches SW 6, SW 7, SW 8, and a noninverting input side connected to an output side of a DAC 25, described later, and an output side of the operational amplifier 23 being connected to the terminal 21f, an ADC 24 connected to the output side of the operational amplifier 23, a DAC 25 having an input side connected to an output side of the digital processing circuit 22, and an output side connected to the noninverting input side of the operational amplifier 23, a regulator 26 for generating a constant potential from the power supply voltage Vdd, and a switch SW9 connected between an output side of the regulator 26 and the inverting input side of the operational amplifier 23.

The output side of the regulator 26 is connected to the terminal 21a to which the resistor 34 and the capacitor 35, described before, are connected. Further, the switch SW9 is connected between the terminal 21a and the terminal 21b. The low pass filter 32 serves as a feedback circuit of the operational amplifier 23. Further, the constant potential Vreg is fed from the regulator 26 to the circuit within an area 21A surrounded by one dotted chain line.

There is described hereinafter an operation of the signal processing system 21 having the configuration described as above.

The voltage corresponding to the strain along the x-axis direction outputted from the point 31e of the pressure-sensitive pointing device 31 is fed from the terminal 21c to the input side of the analog switch SW6. Further, the voltage corresponding to the strain along the y-axis direction outputted from the point 31f of the pressure-sensitive pointing device 31 is fed from the terminal 21d to the input side of the analog switch SW 7. Further, the voltage corresponding to the strain along the z-axis direction outputted from the point 31g of the pressure-sensitive pointing device 31 is fed from the terminal 21b to an input side of the analog switch SW 8.

Rectangular waves Asw 6, Asw 7, Asw 8, Asw 9, undergoing a periodic change in level for every detection period T2, are inputted from the digital processing circuit 22 to the analog switches SW 6, SW 7, SW 8, SW 9, as switching control signals, as shown in FIG. 4. The rectangular waves Asw 6, Asw 7 become high in level alternately during a time period when the rectangular wave Asw 9 is being held high. The analog switches SW 6, SW 7, SW 8, SW 9 are turned on during a time period when the rectangular waves Asw 6, Asw 7, Asw 8, Asw 9 are being held high, and the analog switches SW 6, SW 7, SW 8, SW 9 are turned off during a time period when the rectangular waves Asw 6, Asw 7, Asw 8, Asw 9 are being held low. Accordingly, the switch SW9 is alternately turned on for every detection period T2, and the analog switches SW 6, SW 7 are alternately turned on while the switch SW 9 is in the ON-condition, and the analog switch SW 8 is turned on while the switch SW 9 is in the OFF-condition In this connection, because both the ends of the resistor 34 are short-circuited while the switch SW 9 is in the ON-condition, a potential at the node 31g of the pointing device 31 is fixed to an output potential of the regulator 26. During a time period when the switch SW 9 is in the ON-condition, and the analog switch SW 6 is turned on, the voltage corresponding to the strain along the x-axis direction, outputted from the node 31e of the pointing device 31, is inputted to the inverting input side of the operational amplifier 23 during a time period when the switch SW 9 is in the ON-condition, and the analog switch SW 7 is turned on, the voltage corresponding to the strain along the y-axis direction, outputted from the node 31f of the pointing device 31, is inputted to the inverting input side of the operational amplifier 23. Meanwhile, during a time period when the switch SW 9 is in the OFF-condition, and the analog switch 8 is turned on, the voltage corresponding to the strain along the z-axis direction, outputted from the node 31g of the pointing device 31, is inputted to the inverting input side of the operational amplifier 23. That is, the voltage corresponding to the strain along the x-axis direction, and the voltage corresponding to the strain along the y-axis direction are circularly inputted to the inverting input side of the operational amplifier 23.

Reference data outputted from the digital processing circuit 22 is converted into an analog reference voltage by the DAC 25 to be subsequently inputted to the noninverting input side of the operational amplifier 23. The voltage corresponding to the strain along the x-axis direction, the voltage corresponding to the strain along the y-axis direction are, and the voltage corresponding to the strain along the z-axis direction are circularly amplified by the operational amplifier 23 during a time period when the rectangular waves Asw 7, Asw 8, shown in FIG. 4, are high in level, respectively. Those voltage corresponding to the respective strains are digitized by the ADC 24 to be subsequently inputted to the digital processing circuit 22.

According to the embodiment, since it is structured such that the amplification of the voltages corresponding to the strains along three-axes directions is executed by one operational amplifier 23, the scale of circuit of the signal processing system 21 can be reduced.

Third Embodiment

Figure 5:
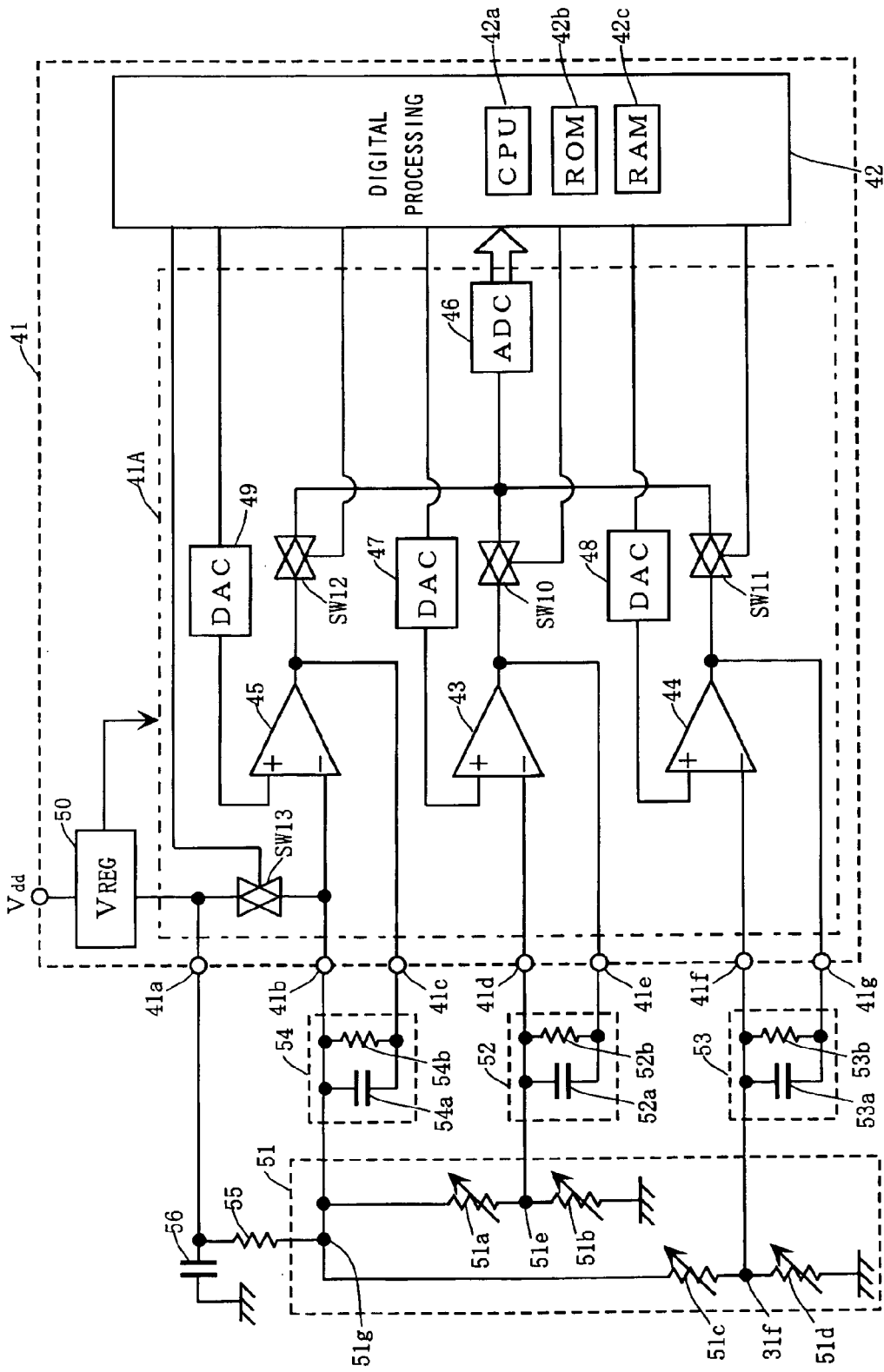
FIG. 5 is a view showing a construction of a third embodiment of a signal processing system according to the invention.
Figure 6:
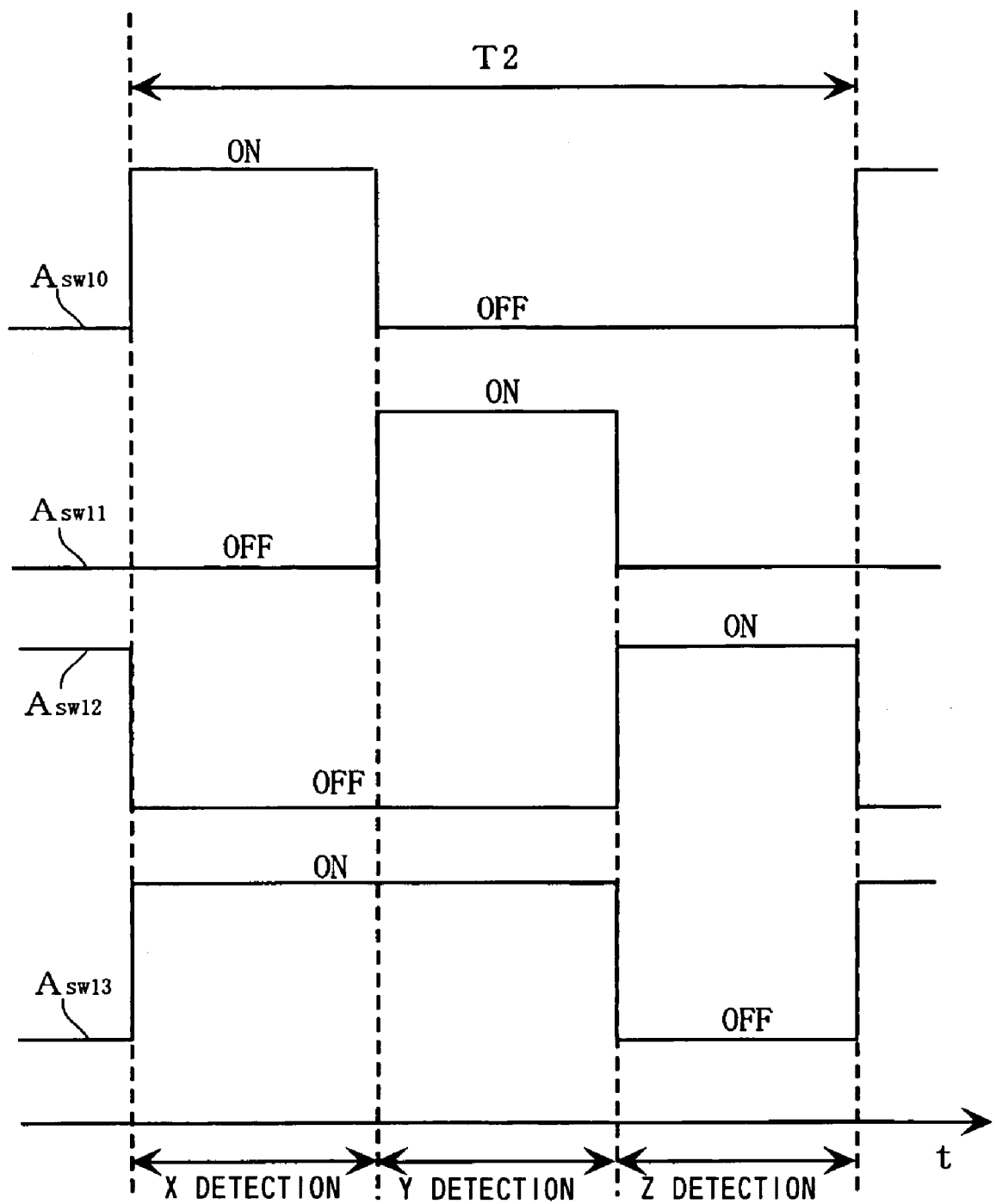
FIG. 6 is an operation timing chart of the signal processing system according to the third embodiment.

FIG. 5 is a view showing a construction of a third embodiment of a signal processing system according to the invention and FIG. 6 is an operation timing chart thereof.

As shown in FIG. 5, an output signal of a pressure-sensitive pointing device 51 is inputted to a signal processing system 41 of the present embodiment. The pressure-sensitive pointing device 51 comprises a strain sensor 51a for detecting a load in a +X direction, a strain sensor 51b for detecting a load in a −X direction, a strain sensor 51c for detecting a load in a +Y direction, and a strain sensor 51d for detecting a load in a −Y direction, the respective loads resulting from an operation of an operation console, not shown. The strain sensors 51a, 51b are connected in series, and the strain sensors 51c, 51d are connected in series. Further, the series-connected circuits are connected in parallel, forming a parallel-connected circuit, and a constant potential Vreg is fed from a regulator 50 to be described later to the parallel-connected circuit via a resistor 55. A capacitor 56 is provided for the purpose of decoupling. In this case, the resistor 55 has a resistance value set to a value equal to the resistance value of the four strain sensors 51a to 51d, under no load. Since an operation when detecting the strain of the pressure-sensitive pointing device 51 is the same as that of the pressure-sensitive pointing device 11 of the first embodiment, omitting therefore description thereof.

Low-pass filters 52, 53, 54 comprise capacitors 52a, 53a, 54a, and resistors 52b, 53b, 54b respectively, and with the low-pass filters 52, 53, 54, an upper cut-off frequency is set to on the order of 150 Hz so as to remove low frequency noise components out of respective output signals of operational amplifiers 43, 44, 45, to be described later. Further, an output side of the low-pass filter 52 is connected to terminals 41d, 41e of the signal processing system 41, respectively, an output side of the low-pass filter 53 is connected to terminals 41f, 41g thereof respectively, and an output side of the low-pass filter 54 is connected to terminals 41b, 41c thereof respectively. Those low-pass filters are equivalent in a basic function to the low-pass filters 12, 13 of the first embodiment.

The signal processing system 41 comprises a digital processing circuit 42 having a CPU 42a, a ROM 42b, a RAM 42c, for executing control of the signal processing system 41 in whole, and so forth, the operational amplifier 43 having an inverting input side connected to the terminal 41d, and a noninverting input side connected to an output side of a DAC 47 to be described later, an output side of the operational amplifier 43 being connected to the terminal 41e, the operational amplifier 44 having an inverting input side connected to the terminal 41f, and a noninverting input side connected to an output side of a DAC 48 to be described later, an output side of the operational amplifier 44 being connected to the terminal 41g, the operational amplifier 45 having an inverting input side connected to the terminal 41b, and a noninverting input side connected to an output side of a DAC 49 to be described later, an output side of the operational amplifier 45 being connected to the terminal 41c, an analog switch SW 10 connected to the output side of the operational amplifier 43, an analog switch SW 11 connected to the output side of the operational amplifier 44, an analog switch SW 12 connected to the output side of the operational amplifier 45, an ADC 46 connected to a common output side of the analog switches SW 10-SW 12, a DAC 47 having an input side connected to an output side of the digital processing circuit 42, and an output side connected to the noninverting input side of the operational amplifier 43, a DAC 48 having an input side connected to the output side of the digital processing circuit 42, and an output side connected to the noninverting input side of the operational amplifier 44, a DAC 49 having an input side connected to the output side of the digital processing circuit 42, and an output side connected to the noninverting input side of the operational amplifier 45, the regulator 50 for generating a constant potential Vreg from the power supply voltage Vdd, and a switch 13 connected between an output side of the regulator 50 and the inverting input side of the operational amplifier 45.

An output side of the regulator 50 is connected to the terminal 41a to which the resistor 55 and the capacitor 56, described before, are connected. Further, the switch SW13 is connected between the terminal 41a and the terminal 41b. The low pass filters 52, 53, 54 serve as feedback circuits of the operational amplifiers 43, 44, 45, respectively. Further, the constant potential Vreg is fed from the regulator 50 to the circuit within an area 1A surrounded by one dotted chain line.

There is described hereinafter an operation of the signal processing system 41 having the configuration described as above.

The voltage corresponding to the strain along the x-axis direction outputted from the node 5le of the pressure-sensitive pointing device 51, the voltage corresponding to the strain along the y-axis direction outputted from the node 51f thereof, and the voltage corresponding to the strain along the z-axis direction outputted from the node 51g thereof are inputted to the inverting input sides of the operational amplifiers 43, 44, 45, respectively, via the terminals 41d, 41f, 41b.

Rectangular waves Asw 10, Asw 11, Asw 12, Asw 13, undergoing a periodic change in level for every detection period T2, are inputted from the digital processing circuit 42 to the analog switches SW 10 to SW 12, and the switch SW 13, as switching control signals, as shown in FIG. 6. The rectangular waves Asw 10, Asw 11 become high in level alternately during a time period when the rectangular wave Asw 13 is being held high while the Asw 12 becomes high in level during a time period when the rectangular wave Asw 13 is being held low. Since the analog switches SW 10 to SW 12, and the switch SW 13 are turned on during a time period when the rectangular waves Asw 10, Asw 11, Asw 12, Asw 13 are being held high, and the analog switches SW 10 to SW 12, and the switch SW 13 are turned off during a time period when the rectangular waves Asw 10, Asw 11, Asw 12, Asw 13 are being held low, the switch SW13 is alternately turned on for every detection period T2, and the analog switches SW 10 to SW 12 are circularly turned on for every detection period T2.

In this connection, because both the ends of the resistor 55 are short-circuited while the switch SW 13 is in the ON-condition, a potential at the node 51g of the pointing device 51 and a potential at the inverting input side of the operational amplifier 45 are fixed to an output potential of the regulator 50. Accordingly, the voltage corresponding to the strain along the x-axis direction and the voltage corresponding to the strain along the y-axis direction are inputted to the respective inverting input sides of the operational amplifiers 43, 44, but the voltage corresponding to the strain along the z-axis direction is not inputted to the inverting input side of the operational amplifier 45. Meanwhile, during a time period when the switch SW 13 is in the OFF-condition, the voltage corresponding to the strain along the z-axis direction outputted from the node 5g of the pointing device is inputted to the inverting input side of the operational amplifier 45. Reference data outputted from the digital processing circuit 42 is converted into an analog reference voltage by the DACs 47, 48, 49 to be subsequently inputted to the respective noninverting input sides of the operational amplifiers 43, 44, 45.

The voltage corresponding to the strain along the x-axis direction, the voltage corresponding to the strain along the y-axis direction and the voltage corresponding to the strain along the z-axis direction, respectively amplified by the operational amplifiers 43, 44 and 45 are outputted circularly from the switches SW10 to SW 12 during a time period when the rectangular waves Asw 10, Asw 11, Asw 12 in FIG. 6 are being held high. Accordingly, the voltage corresponding to the strain along the x-axis direction, the voltage corresponding to the strain along the y-axis direction and the voltage corresponding to the strain along the z-axis direction appear circularly on the common output sides of the switches SW10 to SW 12, namely, on the input side of the ADC 46, as shown in FIG. 6. Those voltages corresponding to the respective strains are digitized by the ADC 46 to be subsequently inputted to the digital processing circuit 42.

Since the present embodiment is structured such that the amplification of the voltages corresponding to the respective strains along three-axes directions is executed by the respective dedicated operational amplifiers, the switching circuits at the input sides of the operational amplifiers are dispensed with.

Fourth Embodiment

Figure 7:
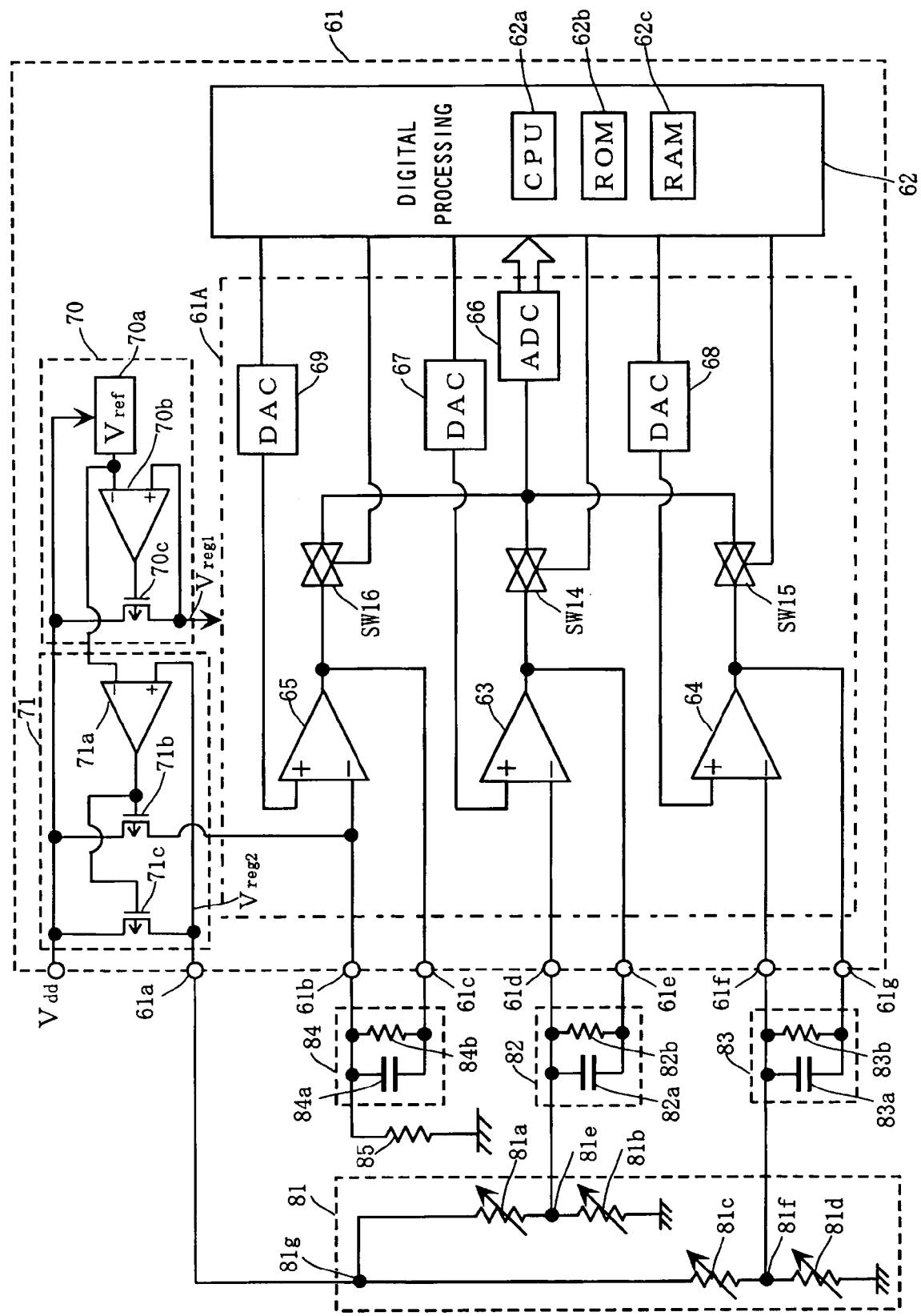
FIG. 7 is a view showing a construction of a fourth embodiment of a signal processing system according to the invention.

FIG. 7 is a view showing a construction of a fourth embodiment of a signal processing system according to the invention.

As shown in FIG. 7, an output signal of a pressure-sensitive pointing device 81 is inputted to a signal processing system 61 of the present embodiment. The pressure-sensitive pointing device 81 comprises a strain sensor 81a for detecting a load in a +X direction, a strain sensor 81b for detecting a load in a −X direction, a strain sensor 81c for detecting a load in a +Y direction, and a strain sensor 81d for detecting a load in a −Y direction, the respective loads resulting from an operation of an operation console, not shown. The strain sensors 81a, 81b are connected in series, and the strain sensors 81c, 81d are connected in series. Further, the series-connected circuits are connected in parallel, forming a parallel-connected circuit, and a second constant potential Vreg 2 is fed to the parallel-connected circuit via a terminal 61a of the signal processing system 61, described later. Since an operation when detecting the strain of the pressure-sensitive pointing device 81 is the same as that of the pressure-sensitive pointing device 11 of the first embodiment, omitting therefore description thereof.

Low-pass filters 82, 83, 84 comprise capacitors 82a, 83a, 84a, and resistors 82b, 83b, 84b respectively, and with the low-pass filters 82, 83, 84, an upper cut-off frequency is set to on the order of 150 Hz so as to remove low frequency noise components out of respective output signals of operational amplifiers 63, 64, 65, to be described later. Further, an output side of the low-pass filter 82 is connected to terminals 61d, 61e of the signal processing system 61, respectively, an output side of the low-pass filter 83 is connected to terminals 61f, 61g thereof, respectively, and an output side of the low-pass filter 84 is connected to terminals 61b, 61c thereof, respectively. Those low-pass filters are equivalent in a basic function to the low-pass filters 52, 53, 54 of the third embodiment. However, according to the present embodiment, a resistor 85 for detecting a voltage is connected in parallel to the low pass filter 84.

The signal processing system 61 comprises a digital processing circuit 62 having a CPU 62a, a ROM 62b, a RAM 62c, for executing control of the signal processing system 61 in whole, and so forth, the operational amplifier 63 having an inverting input side connected to the terminal 61d, and a noninverting input side connected to an output side of a DAC 67 to be described later, an output side of the operational amplifier 63 being connected to the terminal 61e, the operational amplifier 64 having an inverting input side connected to the terminal 61f, and a noninverting input side connected to an output side of a DAC 68 to be described later, an output side of the operational amplifier 64 being connected to the terminal 61g, the operational amplifier 65 having an inverting input side connected to the terminal 61b, and a noninverting input side connected to an output side of a DAC 69 to be described later, an output side of the operational amplifier 65 being connected to the terminal 61c, analog switch SW 14, SW 15, SW 16 connected to the output sides of the operational amplifier 63, 64, 65, respectively, an ADC 66 connected to a common output side of the analog switches SW 14-SW 16, a DAC 67 having an input side connected to an output side of the digital processing circuit 62, and an output side connected to the noninverting input side of the operational amplifier 63, a DAC 68 having an input side connected to the output side of the digital processing circuit 62, and an output side connected to the noninverting input side of the operational amplifier 64, a DAC 69 having an input side connected to the output side of the digital processing circuit 62, and an output side connected to the noninverting input side of the operational amplifier 65, a regulator 70 for generating a first constant potential Vreg 1 from the power supply voltage Vdd, and a current detection circuit 71 doubling as a regulator for generating a second reference voltage Vreg 2 from the power supply voltage Vdd and detecting a current flowing into the pressure-sensitive pointing device 81.

The regulator 70 stabilizes the power supply voltage Vdd by a constant voltage circuit 70a to be subsequently fed to the inverting input side of the operational amplifier 70, and fetches a first reference voltage Vreg 1 from a PMOS transistor 70c connected to the output side of an operational amplifier 70b, then supplies the first reference voltage Vreg1 to a circuit within an area 61A surrounded by one dotted chain line. The current detection circuit 71 doubling as a regulator feeds an output voltage of the constant voltage circuit 70a to an inverting input side of an operational amplifier 71a, fetches the second reference voltage Vreg 2 from a PMOS transistor 71c connected to the output side of the operational amplifier 71a, and feeds the second reference voltage Vreg 2 to a node 81g of the pressure-sensitive pointing device 81 via a terminal 61a, then copies a current flowing from the PMOS transistor 71c into a ground via the node 81g of the pressure-sensitive pointing device 81 into a PMOS transistor 71b by a current mirror operation. Since the current copied into the PMOS transistor 71b flows into the resistor 85 via the terminal 61b, a voltage corresponding to the current flowing into the pressure-sensitive pointing device 81 appears on both the ends of the resistor 85. This voltage corresponds to the voltage at the node 81g and it is inputted to the inverting input side of the operational amplifier 65 as a voltage corresponding to the strain along the z-axis direction. Meanwhile, the current value when copying the current from the PMOS transistor 71c into the PMOS transistor 71b is not necessary to be 1:1, it is preferable to be small, e.g., on the order of 1/100 while a resistance value of the resistor 85 is rendered large.

That is, the present embodiment is to provide a current mirror circuit comprised of the PMOS transistor 71b, PMOS transistor 71c, and the resistor 85 instead of the switch SW13 and the resistor 55 of the third embodiment. Meanwhile, the reason why the regulator 70 for feeding a power to the circuit within the area 61A surrounded by one dotted chain line and the current detection circuit 71 doubling as the regulator for feeding the power to the pressure-sensitive pointing device 81 are separated from each other is not to vary the voltage to be fed to the circuit within the area 61A even if the load applied to the current detection circuit 71 doubling as the regulator is varied to thereby vary the output voltage due to the change in resistance of the sensor of the pressure-sensitive pointing device 81.

There is described hereinafter an operation of the signal processing system 61 having such a configuration described as above.

The voltage corresponding to the strain along the x-axis direction outputted from a node 81e of the pressure-sensitive pointing device 81 and the voltage corresponding to the strain along the y-axis direction outputted from a node 81f thereof are inputted to the inverting input sides of the operational amplifiers 63, 64 via terminals 61d, 61f. Further, the current flowing into pressure-sensitive pointing device 81 is detected by the current mirror comprised of the PMOS transistors 71b, 71c, and a voltage proportional to the detected current is detected by the resistor 85 to be subsequently inputted to the inverting input side of the operational amplifier 65. Reference data outputted from the digital processing circuit 62 is converted into an analog reference voltage by the DACs 67, 68, 69 to be subsequently inputted to the noninverting input sides of the operational amplifiers 63, 64, 65. The voltages corresponding to respective strains along the x-axis, Y-axis and Z-axis directions amplified by the operational amplifiers 63 to 65 are fed respectively to the input sides of the analog switches SW14, SW15, SW16.

Signals having the same waveforms as the rectangular waves Asw 10, Asw 11, Asw 12 in FIG. 6 are inputted from the digital processing circuit 62 to the analog switches SW 14 to SW 16, as switching control signals. The analog switches SW 14 to SW 16 are turned on during a time period when the signals having the same waveforms as the rectangular waves Asw 10, Asw 11, Asw 12 are being held high, and the analog switches SW 14 to SW 16 are turned on during a time period when the signals having the same waveforms as the rectangular waves Asw 10, Asw 11, Asw 12 are being held LOW, hence the analog switches SW 14 to SW 16 are circularly turned on for every detection period T2. Accordingly, the voltage corresponding to the strain along the x-axis direction, the voltage corresponding to the strain along the y-axis direction and the voltage corresponding to the strain along the z-axis direction appear circularly on the common output side of the switches SW14 to SW 16, namely, on the input side of the ADC 66. Those voltages corresponding to the respective strains are digitized by the ADC 66 to be subsequently inputted to the digital processing circuit 62. According to the present embodiment, the switching circuit for detecting the voltage corresponding to the strain along the z-axis direction is dispensed with.

Fifth Embodiment

Figure 8:
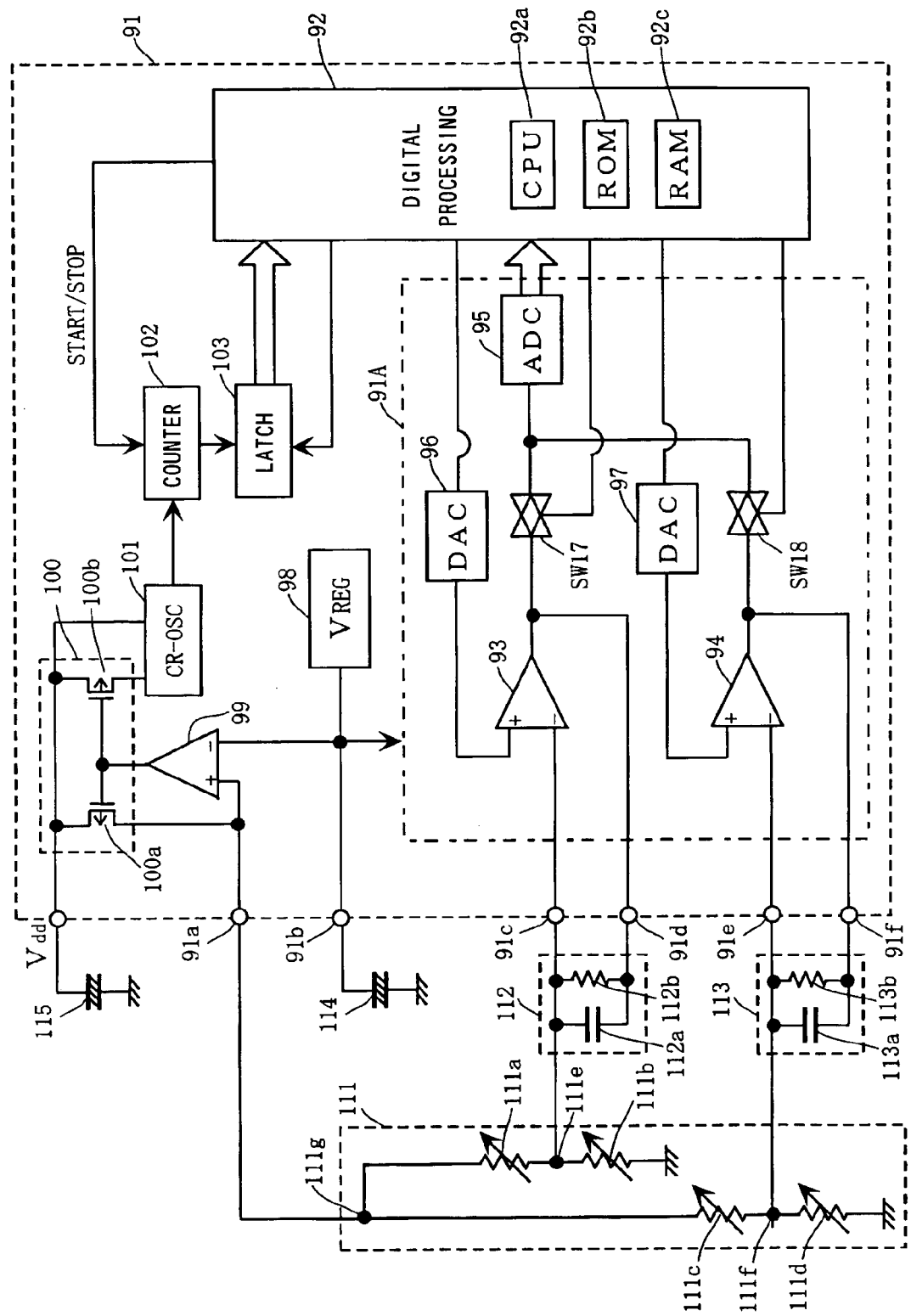
FIG. 8 is a view showing a construction of a fifth embodiment of a signal processing system according to the invention.
Figure 9:
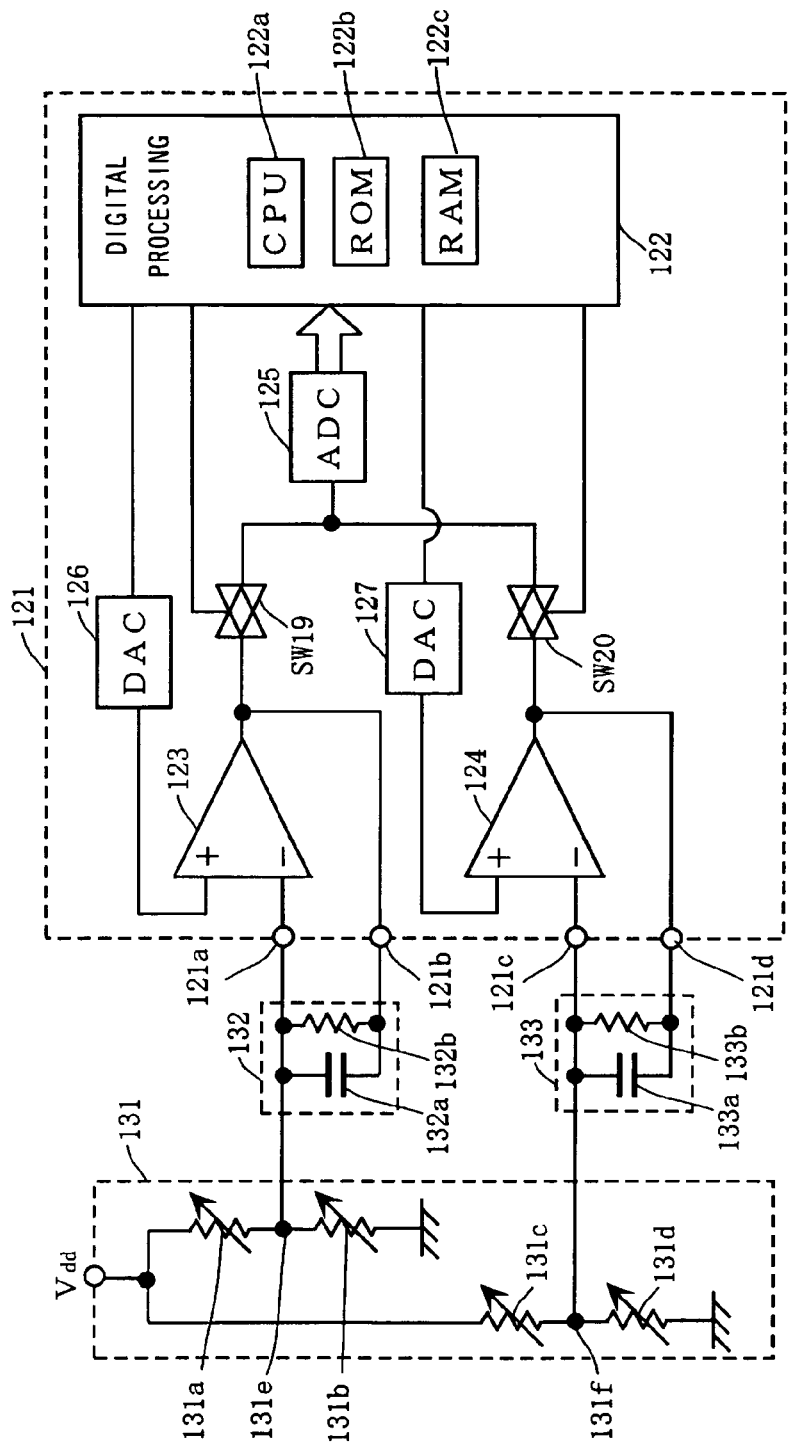
FIG. 9 is a view showing a construction of a conventional signal processing system.
Figure 10:
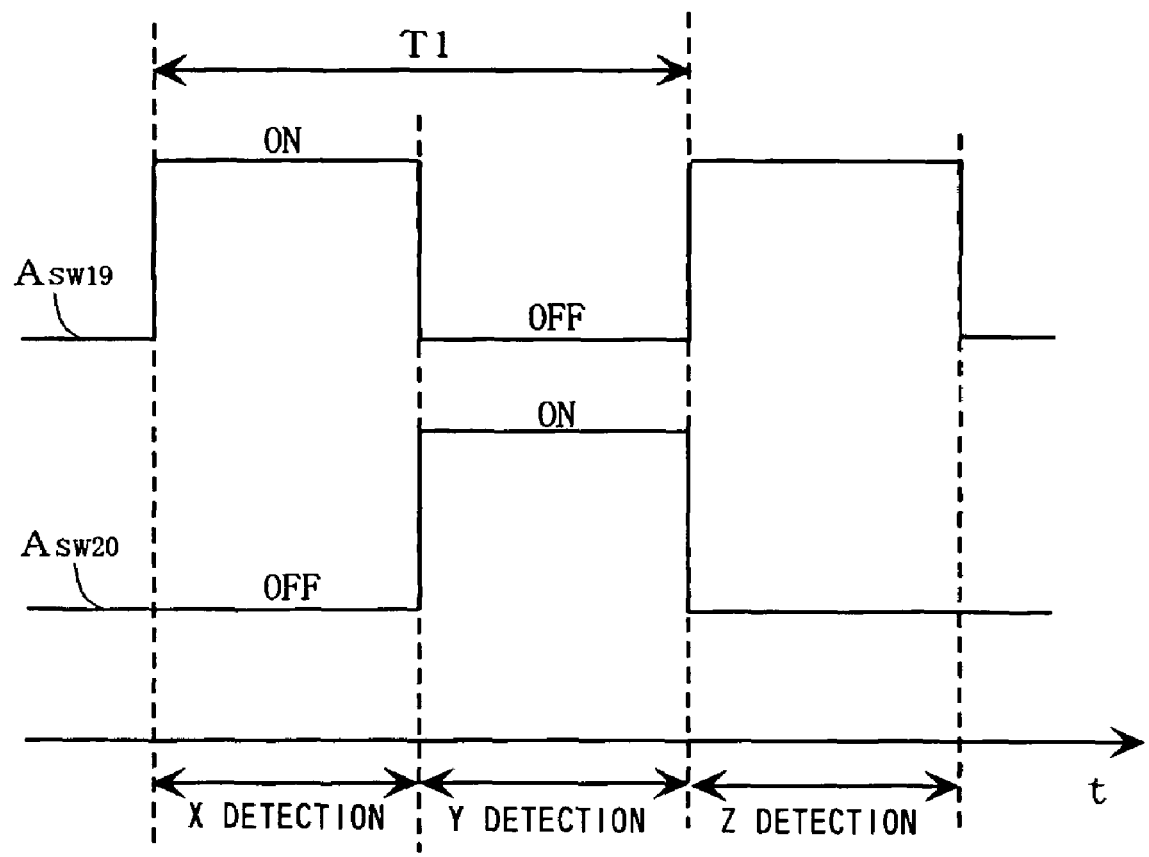
FIG. 10 is an operation timing chart of the conventional signal processing system.

FIG. 8 is a view showing a construction of a fifth embodiment of a signal processing system according to the invention.

As shown in FIG. 8, an output signal of a pressure-sensitive pointing device 111 is inputted to a signal processing system 91 of the present embodiment. The pressure-sensitive pointing device 111 comprises a strain sensor 111a for detecting a load in a +X direction, a strain sensor 111b for detecting a load in a –X direction, a strain sensor 111c for detecting a load in a +Y direction, and a strain sensor 111d for detecting a load in a –Y direction, the respective loads resulting from an operation of an operation console, not shown. The strain sensors 111a, 111b are connected in series, and the strain sensors 111c, 111d are connected in series. Further, the series-connected circuits are connected in parallel, forming a parallel-connected circuit, and a constant potential Vreg is fed to the parallel-connected circuit via a terminal 91a of the signal processing system 91, described later. Since an operation when detecting the strain of the pressure-sensitive pointing device 111 is the same as that of the pressure-sensitive pointing device 11 of the first embodiment, omitting therefore description thereof.

Low-pass filters 112, 113 comprise capacitors 112a, 113a, and resistors 112b, 113b, respectively, and with the low-pass filters 112, 113, an upper cut-off frequency is set to on the order of 150 Hz so as to remove low frequency noise components out of respective output signals of operational amplifiers 93, 94, to be described later. Further, an output side of the low-pass filter 112 is connected to terminals 91c, 91f of the signal processing system 91, respectively, an output side of the low-pass filter 113 is connected to terminals 91e, 91f thereof, respectively. Those low-pass filters are equivalent in a basic function to the low-pass filters 82, 83 of the fourth embodiment. A capacitor 114 connected to the terminal 91b and a capacitor 115 connected to a terminal to which the power supply voltage Vdd is fed are provided for the purpose of decoupling.

The signal processing system 91 comprises a digital processing circuit 92 having a CPU 92a, a ROM 92b, a RAM 92c, for executing control of the signal processing system 91 in whole, and so forth, the operational amplifier 93 having an inverting input side connected to the terminal 91c, and a noninverting input side connected to an output side of a DAC 96 to be described later, an output side of the operational amplifier 93 being connected to the terminal 91d, the operational amplifier 94 having an inverting input side connected to the terminal 91e thereof, and a noninverting input side connected to an output side of a DAC 97 to be described later, an output side of the operational amplifier 94 being connected to the terminal 91f thereof, an analog switch SW 17 connected to the output side of the operational amplifier 93, an analog switch SW 18 connected to the output side of the operational amplifier 94, a DAC 95 connected to a common output side of the analog switches SW 17, 18, a DAC 96 having an input side connected to an output side of the digital processing circuit 92, and an output side connected to the noninverting input side of the operational amplifier 93, a DAC 97 having an input side connected to the output side of the digital processing circuit 92, and an output side connected to the noninverting input side of the operational amplifier 94, a regulator 98 for generating a constant potential Vreg from the power supply voltage Vdd, an operational amplifier 99 having an inverting input side connected to an output side of the regulator 98, and a noninverting input side connected to a node 111g of the pressure-sensitive pointing device 111, via the terminal 91a, an output side of the operational amplifier circuit 99 being connected to a current mirror circuit 100, described later, the current mirror circuit 100 comprised of PMOS transistors 100a, 100b, a CR oscillator 101 to which an output current of the current mirror circuit 100 is fed, a counter 102 for counting an output signal of the CR oscillator 101, and a latch circuit 103 for latching an output value of the counter 102, to be subsequently transferred to the digital processing circuit 92 at a prescribed timing. Here, the constant potential Vreg is fed from the regulator 98 to a circuit within an area 91A surrounded by one-dotted chain line.

The PMOS transistor 100a of the current mirror circuit 100 has a source connected to a terminal to which the power supply voltage Vdd is fed, a drain connected to an input side of the noninverting input side of the operational amplifier 99, and a gate connected to the output side of the operational amplifier 99. The PMOS transistor 100b has a source connected to the terminal to which the power supply voltage Vdd is fed, a drain connected to an input side of the CR oscillator 101, and a gate connected to the output side of the operational amplifier 99. A signal for starting and stopping a counting operation of the counter 102 and a signal for determining timing at which data clutched in the latch circuit is transferred to the digital processing circuit 92 are fed from the digital processing circuit 92.

There is described hereinafter an operation of the signal processing system 91 having such a configuration described as above.

The voltage corresponding to the strain along the x-axis direction outputted from the node 111e of the pressure-sensitive pointing device 111 and the voltage corresponding to the strain along the y-axis direction outputted from the node 111f thereof are inputted to the inverting input sides of the operational amplifiers 93, 94 via the terminals 91c, 91e. Then, those voltages corresponding to respective strains are amplified by the operational amplifiers 93, 94, to be subsequently inputted to the analog switches SW17 and SW18. Signals having the same waves as the rectangular waves Asw10, Asw 11 in FIG. 6 are inputted from the digital processing circuit 92 to the analog switches SW17 and SW18 as switching control signals. The analog switches SW17 and SW18 are turned on for a period during which the signals having the same waves as the rectangular waves Asw10, Asw 12 are in high level, and turned off for a period during which they are in low level, so that the analog switches SW17 and SW18 are turned on alternately for every detection period T2. Accordingly, the voltage corresponding to the strain along the x-axis direction and the voltage corresponding to the strain along the y-axis direction appear alternately on the common output side of the switches SW17 and SW18, namely, on the input side of the ADC 95. These voltages corresponding to the respective strains are digitized by the ADC 95, to be subsequently inputted to the digital processing circuit 92.

There is described hereinafter the voltage corresponding to the strain along the z-axis direction. The current flowing into the pressure-sensitive pointing device 111 is equal to a current flowing between the source-drain of the PMOS transistors 100*a* constituting the current mirror circuit 100. Accordingly, this current is copied into the PMOS transistor 100*b* constituting the current mirror circuit 100. If the oscillation frequency of the CR oscillator 101 is controlled corresponding to the current of the PMOS transistor 100*b*, and the controlled oscillation frequency is counted by the counter 102, the counted value becomes a current flowing into the pressure-sensitive pointing device 111, consequently, a voltage of the node 111*g* of the pressure-sensitive pointing device 111, namely, a value corresponding to the voltage corresponding to the strain along the z-axis direction. Then, the value counted by the counter 102 is stored in the latch circuit 103 and the stored counted value is transferred to the digital processing circuit 92 at an arbitrary timing, e.g., during a time period when the rectangular wave Asw12 in FIG. 6 becomes high in level. With the procedure set forth above, the digital processing circuit 92 can circularly obtain the voltage corresponding to the strain along the x-axis direction, the voltage corresponding to the strain along the y-axis direction and the voltage corresponding to the strain along the z-axis direction.

According to the present embodiment, a switching circuit for detecting the voltage corresponding to the strain along the z-axis direction is dispensed with. Further, since the frequency counting system is employed, there achieves an operation to reduce noises due to an integration effect thereof. Accordingly, a low pass filter for removing the low frequency noise components of the voltage corresponding to the strain along the z-axis direction is dispensed with.

The invention claimed is:

1. A signal processing system for a pointing input device for processing signals outputted from a pointing device, the pointing device comprising:
   a first serially connected circuit including a first resistance element (81*a*) which is changed in resistance value in response to a load applied to the device by operating an operation console in the plus direction along the x-axis,
   a second resistance element (81*b*) which is serially connected to the first resistance element (81*a*) and changed in resistance value in response to a load applied to the device by operating the operation console in the minus direction along the x-axis;
   a second serially connected circuit including a third resistance element (81*c*) which is changed in resistance value in response to a load applied to the device by operating the operation console in the plus direction along the y-axis, and
   a fourth resistance element (81*d*) which is serially connected to the third resistance element (81*c*) and changed in resistance value in response to a load applied to the device by operating the operation console in the minus direction along the y-axis; said first and second serially connected circuits are connected in parallel, a shifting operation signal output terminal in the x-axis direction provided at a node (81*e*) between the first and second serially connected circuits (81*a*,81*b*), for fetching a voltage of the node, and a shifting operation signal output terminal in the y-axis direction provided at a node (81*f*) between the third and fourth serially connected circuits (81*c*,81*d*), for fetching a voltage of the node,
   wherein the signal processing system for a pointing input device comprises a current detection circuit doubling as a regulator (71) including a constant voltage circuit (71*a*) and a current mirror circuit (71*b*,71*c*), for generating a reference voltage (Vreg2) from a power supply voltage (Vdd) to thereby generate voltage to be fed to a parallel node (81*g*), and for detecting a current flow at the parallel node by copying by the current mirror circuit (71*b*,71*c*), a resister (85) for converting the copied current flow into a voltage, and for generating a clicking operation signal corresponding to the change in respective resistance values of the first to fourth resistance elements (81*a*-81*d*) in response to a load applied to the device by operating the pointing device in the direction along the z-axis, a first amplifier (63) for amplifying the shifting operation signal in the x-axis direction, a second amplifier (64) for amplifying the shifting operation signal in the y-axis direction, a third amplifier(65) for amplifying the clicking operation signal, switching circuits (SW14-16) for switching over among output signals of the first to third amplifiers(63-65) to thereby output the switched signal, a regulator(70) for generating a reference voltage (Vreg1) from the power supply voltage (Vdd) to thereby supply the reference voltage to the first to third amplifiers(63-65) and the switching circuits (SW 14-16), and a controller(62) for executing control of switchover such that the switching circuits (SW 14-16) output the output signals of the first to third amplifiers (63-65) alternately for every predetermined period.

\* \* \* \* \*